(12) United States Patent
Frauenthal et al.

(10) Patent No.: US 8,238,548 B2
(45) Date of Patent: Aug. 7, 2012

(54) CONTROLLING ECHO DURING DOUBLE-TALK IN A VOICE CONFERENCE

(75) Inventors: James C. Frauenthal, Colts Neck, NJ (US); Michael A. Ramalho, Sarasota, FL (US); Gary Skrabutenas, Palo Alto, CA (US); Herbert Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1050 days.

(21) Appl. No.: 12/028,594

(22) Filed: Feb. 8, 2008

(65) Prior Publication Data

US 2009/0202063 A1    Aug. 13, 2009

(51) Int. Cl.
*H04M 9/08* (2006.01)
*H04M 1/00* (2006.01)
*H04M 3/42* (2006.01)
*H04M 9/00* (2006.01)

(52) U.S. Cl. ............. 379/406.16; 379/158; 379/202.01; 379/390.03; 379/395

(58) Field of Classification Search .......... 370/260–269, 370/288
See application file for complete search history.

(56) References Cited

U.S. PATENT DOCUMENTS

| | | | |
|---|---|---|---|
| 4,741,025 A * | 4/1988 | Maruyama et al. ...... | 379/202.01 |
| 5,386,465 A * | 1/1995 | Addeo et al. ............ | 379/202.01 |
| 5,764,753 A * | 6/1998 | McCaslin et al. ........ | 379/406.07 |
| 6,728,222 B1 * | 4/2004 | Ono ........................ | 370/260 |
| 6,847,618 B2 * | 1/2005 | Laursen et al. ............ | 370/261 |
| 7,283,543 B1 * | 10/2007 | Thompson ................ | 370/401 |
| 2004/0037419 A1 * | 2/2004 | Zhang et al. ............. | 379/406.07 |
| 2004/0076271 A1 * | 4/2004 | Koistinen et al. ......... | 379/88.11 |
| 2005/0129225 A1 * | 6/2005 | Piket et al. ............... | 379/406.01 |
| 2006/0007872 A1 | 1/2006 | Liu | |
| 2006/0018458 A1 * | 1/2006 | McCree et al. .......... | 379/406.01 |
| 2006/0149542 A1 * | 7/2006 | Tanrikulu et al. .......... | 704/233 |
| 2008/0118055 A1 | 5/2008 | Otani et al. | |
| 2008/0159507 A1 * | 7/2008 | Virolainen et al. ...... | 379/202.01 |
| 2008/0159552 A1 | 7/2008 | Guerin | |

OTHER PUBLICATIONS

Tampa Bay Interactive. Echo Control Techniques [online]. Published by Tampa Bay Interactive. [retrieved on Sep. 23, 2008]. Oct. 2004. Retrieved from the Internet: <URL: http://telecom.tbi.net/echoctl.htm>. pp. 1-6.

* cited by examiner

*Primary Examiner* — Fan Tsang
*Assistant Examiner* — Jeffrey Lytle
(74) *Attorney, Agent, or Firm* — Hickman Palermo Truong Becker Bingham Wong LLP

(57) ABSTRACT

An echo canceller apparatus comprises a receive side attenuator coupled in a receive side signal path that is configured to couple from a conference call bridge to a caller; a convolution processor coupled to the receive side signal path at a convolution processor pick-off point; a double-talk detector coupled to the receive side signal path and to a sending side signal path that is configured to couple from the caller to the conference call bridge; and logic coupled to the receive side attenuator which when executed is responsive to a double-talk condition detected by the double-talk detector and operable to determine a level of echo canceled by the convolution processor, to determine an additional amount of attenuation to introduce, and to activate the receive side attenuator to introduce the additional attenuation.

26 Claims, 3 Drawing Sheets

10

CONTROLLING ECHO DURING DOUBLE-TALK IN A VOICE CONFERENCE

TECHNICAL FIELD

The present disclosure generally relates to apparatus, circuits and methods that cancel echo in telecommunications systems. The disclosure relates more specifically to canceling echo during double-talk in a voice conference call.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Echo cancellers (ECANs) used in telecommunication networks generally consist of two sound level reduction components: a convolution processor (CP) and a non-linear processor (NLP). The CP and the NLP operate in different ways depending upon whether multiple parties are speaking simultaneously in a call, or if there is just one party speaking at a time.

When only one party in a point-to-point connection is talking at a time, a CP controller compares the signal in the two directions, forms an estimate of the echo signal (via estimation of the echo path impulse response) and then injects the negative of its echo estimate into the return path to eliminate the echo. As long as the echo signal is a linear and time-invariant function of the original signal, and is within the time range of the ECAN, the CP can effectively cancel the echo.

Since the coder-decoder (codec) circuits used in telecommunication networks may be non-linear, introduce distortion, and/or may not be time-invariant, the cancellation is imperfect. Therefore, an NLP is coupled in the circuit after the CP to eliminate any residual echo. The NLP acts on the output of the CP by attenuating the residual echo so as to make it inaudible.

If both parties in a point-to-point telephone connection speak at the same time, a condition called double-talk, the ECAN operates in a different mode than when only one party talks at a time. During double-talk, the NLP is eliminated from the transmission path, because otherwise the NLP could seriously degrade the near-end speech due to the added attenuation introduced by the NLP. Further, the CP controller typically stops updating its estimate of the echo path impulse response. The decision to eliminate the NLP and to stop updating the impulse response estimate for the CP is made by a Double-talk Detector (DTD) circuit or algorithm. The DTD is a signal processing control function that is typically a part of the ECAN.

During double-talk, as long as there are only two parties in a telephone connection, the fact that the echo canceller is working considerably less effectively, because the CP impulse response estimate updating has stopped and because the NLP has been eliminated, is not noticed. When two people are talking simultaneously, each person is typically less attentive to echo than when only one is person is talking, in part because the speech of the other person masks the echo of each talker.

However, the foregoing approach is not fully effective in achieving echo cancellation when the echo path impulse response is beyond the coverage length of the existing CP or when the echo path is not linear and time invariant, which occurs with many low-bit rate codecs.

Known manufacturers of voice conferencing systems include Biamp (AudiaFlex and Nexia), Clearone (XAP), Polycom (Vortex), Avaya Meeting Exchange (formerly made by Spectel), Radvision (Scopia), and Compunetix (Contex). None are known to address network echo control as described herein.

DETAILED DESCRIPTION

Figure 1:
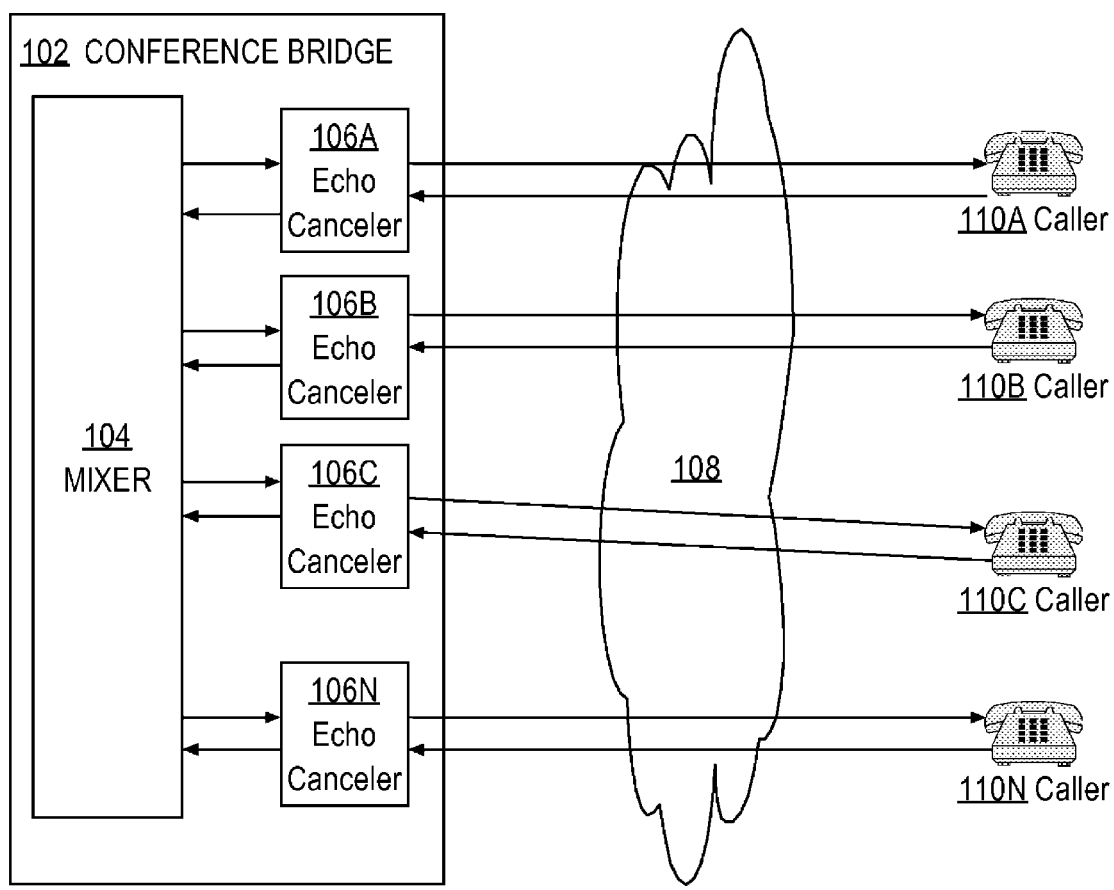
FIG. 1 illustrates a conference bridge networked to callers and including echo cancellers.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 General Overview

In the following description, the terms "receive side" and "send side" are specified from the perspective of the caller.

In an embodiment, an echo canceller apparatus comprises a receive side attenuator coupled in a receive side signal path that is configured to couple from a conference call bridge to a caller; a convolution processor whose input is coupled to the receive side signal path at a pick-off point; a double-talk detector coupled to the receive side signal path and to a sending side signal path that is configured to couple from a caller to the conference call bridge; and logic coupled to the receive side attenuator which is responsive to a double-talk condition detected by the double-talk detector, determines an additional amount of attenuation to introduce and activates the receive side attenuator to introduce the additional attenuation.

In an embodiment, the apparatus further comprises logic which when executed by the processor is operable to disable the receive side attenuator when the double-talk condition ends, to detect a further occurrence of double-talk, and in response thereto, to stop adaptation of the convolution processor, deactivate a non-linear processor that is coupled in the sending side signal path, and to again activate the receive side attenuator to introduce the additional attenuation. Although the above description uses "hard" decision logic, it may be the case that these decisions are "soft"; which means that the rate of adaptation and amount of attenuation are functions of the estimated likelihood of double-talk.

In an embodiment, the receive side attenuator is coupled in the receive side signal path before the CP pick-off point and the DTD pick-off points, and the receive-side attenuator may be in the conference bridge. In an embodiment, the receive side attenuator is coupled in the receive side signal path after the CP pick-off point but before the DTD pick-off point. In an embodiment, the receive side attenuator is coupled in the receive side signal path after both the CP pick-off point and the DTD pick-off point.

In an embodiment, the apparatus further comprises a first control signal path coupled from the conference call bridge to the receive side attenuator, and logic which when executed is operable to cause the conference call bridge logic to influence the additional amount of attenuation to introduce. In an embodiment, the apparatus further comprises a second control signal path coupled from the double-talk detector to the receive side attenuator, and logic which when executed is operable to cause the conference call bridge to communicate with the double-talk detector using one or more of the control signal paths to determine the level of echo canceled by the convolution processor.

In an embodiment, the apparatus further comprises logic which when executed causes obtaining an echo return loss enhancement (ERLE) value from the convolution processor and using the ERLE to affect the amount of attenuation. In an embodiment, the apparatus further comprises logic which when executed causes activating the receive side attenuator only when a speaker engaged in double-talk is actually in a mix of speakers that are being played out from the conference call bridge.

In an embodiment, a conference call bridge apparatus comprises a mixer; a plurality of echo cancellers coupled to the mixer, and each of the echo cancellers comprises a receive side attenuator coupled in a receive side signal path that is configured to couple from the conference call bridge to a caller; a convolution processor coupled to the receive side signal path at a pick-off point; a double-talk detector coupled to the receive side signal path and to a sending side signal path that is configured to couple from the caller to the conference call bridge; and logic coupled to the receive side attenuator which when executed is responsive to a double-talk condition detected by the double-talk detector and operable to determine a level of echo canceled by the convolution processor, to determine an additional amount of attenuation to introduce, and to activate the receive side attenuator to introduce the additional attenuation.

In an embodiment, a computer-implemented method or algorithm comprises detecting an occurrence of double-talk in a call; determining a level of residual echo that has been canceled by a convolution processor; determining an amount of additional attenuation to introduce in an echo canceller that is processing the call; activating a receive-side attenuator in the echo canceller to introduce the additional attenuation; and disabling the receive-side attenuator when the double-talk ends. In an embodiment, the method further comprises detecting a further occurrence of double-talk, and in response thereto, stopping or slowing the adaptation of the convolution processor, deactivating a non-linear processor that is coupled in the sending side signal path, and again activating the receive side attenuator to introduce the additional attenuation.

In an embodiment, the method further comprises activating the receive side attenuator in a receive side signal path, which is configured to couple from a conference call bridge to a caller, before a pick-off point in the receive side signal path at which a convolution processor is coupled. In an embodiment, the method further comprises activating the receive side attenuator in a receive side signal path, which is configured to couple from a conference call bridge to a caller, after a pick-off point in the receive side signal path at which a convolution processor is coupled.

In an embodiment, the method further comprises activating the receive side attenuator in a conference call bridge. In an embodiment, the method further comprises determining in a conference call bridge the additional amount of attenuation to introduce and providing the additional amount of attenuation to introduce to the receive side attenuator on a first control signal path that is coupled from the conference call bridge to the receive side attenuator. In an embodiment, the method further comprises causing the conference call bridge to communicate with the double-talk detector to determine the level of echo canceled by the convolution processor, using one or more of the first control signal path and a second control signal path coupled from the double-talk detector to the receive side attenuator.

In an embodiment, the method further comprises obtaining an echo return loss enhancement (ERLE) value from the convolution processor and using the ERLE to determine the additional amount of attenuation. In an embodiment, the method further comprises activating the receive side attenuator only when a speaker engaged in double-talk is actually in a mix of speakers that are being played out from the conference call bridge.

2.0 Structural and Functional Overview

In an embodiment, an echo canceller comprises a receive-side signal attenuator (RSA) that provides echo suppression when the echo path impulse response is beyond the coverage length of the existing convolution processor (CP) or when the echo path is not linear and time invariant, as occurs with many low-bit rate codecs. In an embodiment, when an echo canceller or other system senses that echo is not well controlled, in response, the RSA is activated. In various embodiments, the RSA comprises an element of an ECAN or comprises an external element coupled to an echo canceller. Embodiments may be implemented in a voice conference bridge to improve echo control during double-talk.

The approach herein provides numerous benefits that are not found in prior approaches, including: the system is designed to control echo in conference bridges during double-talk by some participants; the amount of attenuation introduced may be adjusted based on the amount of residual echo present; conference bridge participants engaged in double-talk generate less echo for other users not in double-talk; conference bridge participants engaged in double-talk and included in the mix from the mixer generate less echo for other users not in double-talk; conference bridge participants engaged in double-talk hear improved echo performance relative to traditional echo cancellers; and conference bridge participants not engaged in double-talk have active echo control unaffected.

For purposes of illustrating a clear example, the present approach is described in a voice conference bridge capable of supporting a number of simultaneous users. However, other embodiments may be implemented in apparatus other than bridges. Assume for the purpose of illustrating an example that n participants are in a voice the conference. The voice conference bridge allows one or more of the participants (potentially up to all n, though most conference bridges limit the number of simultaneous speakers included in the mix) to talk at any instant and all n to hear. The two directions of transmission, normally called send and receive, are fully separated from one another, except within the signal mixer in the bridge, and at the telephone endpoints where the callers are located.

FIG. 1 illustrates a conference bridge networked to callers and including echo cancellers. A conference bridge 102 comprises a mixer 104 coupled to a plurality of echo cancellers 106A, 106B, 106C, 106N. Various embodiments may have any number of echo cancellers, and at least n echo cancellers would be used in the example described above. The echo cancellers 106A, 106B, 106C, 106N are coupled through one or more networks, represented by network 108, to callers 110A, 110B, 110C, 110N respectively. Network 108 may comprise a packet-switched network carrying voice-over-IP traffic, the public switched telephone network (PSTN), a combination thereof, or other combinations of voice networks, data networks, circuit-switched networks and packet-switched networks.

As shown in FIG. 1, there are a total of n active calls that are bridged together in the conference bridge. Assume for purposes of illustrating an example that each call supports a single user; however, the system described herein operates identically if one or more of the endpoints support several users participating by means a speakerphone.

Each caller 110A, 110B, 110C, 110N has a corresponding ECAN 106A, 106B, 106C, 106N that is associated with the conference bridge. Each ECAN 106A, 106B, 106C, 106N is oriented so that it cancels any echo that is reflected from the adjacent callers shown in FIG. 1. Thus, the tail of each ECAN is facing the callers.

Assume now that n=2, so the only callers are caller 110A and caller 110B. When caller 110A speaks and caller 110B is silent, if caller 110A hears talker echo (the echo of what caller 110A is saying) then the echo results from the circuitry near caller 110B; the echo from this circuitry is intended to be controlled by ECAN 106B in FIG. 1. More generally, if there are n>2 callers and only caller 110A speaks, any talker echo heard by caller 110A could come from the circuitry associated with any of or some combination of the circuitry of the other n−1 callers. Thus, the talker echo of caller 110A should be controlled by ECAN 106B, 106C, 106N.

Many conference bridges comprise a speech detector that monitors for the presence of an active signal directed into the conference mixer. The primary function of the speech detector is to determine whether active speech is present. A subsidiary function is to perform a partial summation so that the mixed signal played to the active speaker does not include the speech component due to the active speaker. Thus, for example, when caller 110A talks, the speech detector determines that caller 110A is speaking and does not include the speech from caller 110A into the mixture played to caller 110A.

Figure 2:
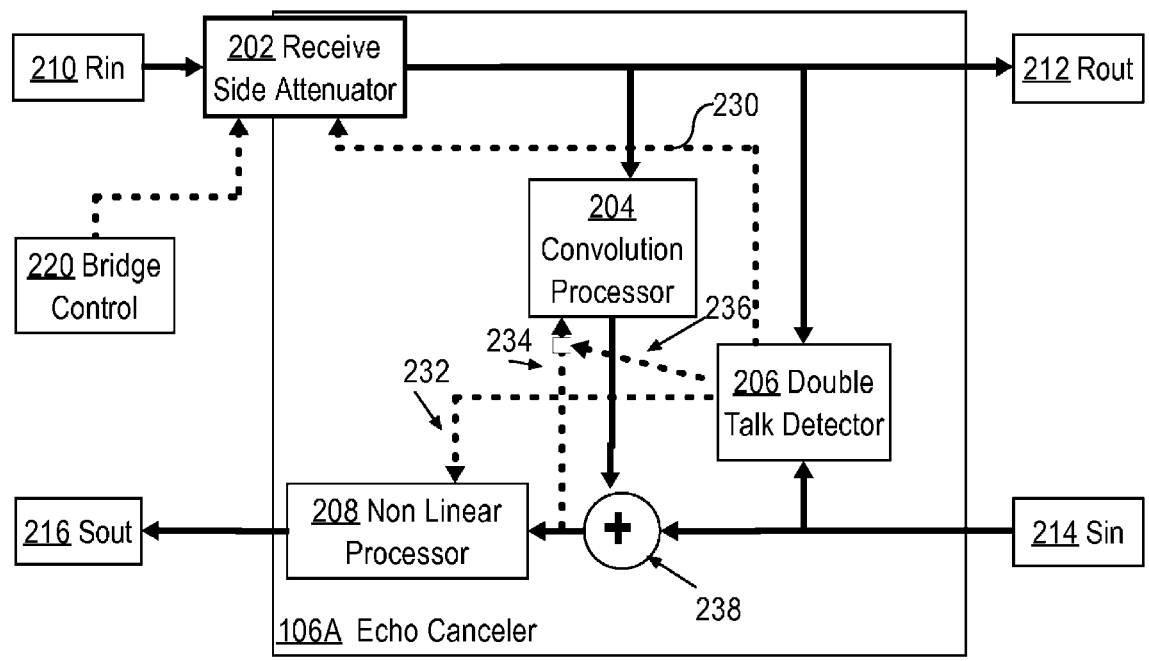
FIG. 2 illustrates a first embodiment of an echo canceller.
Figure 3:
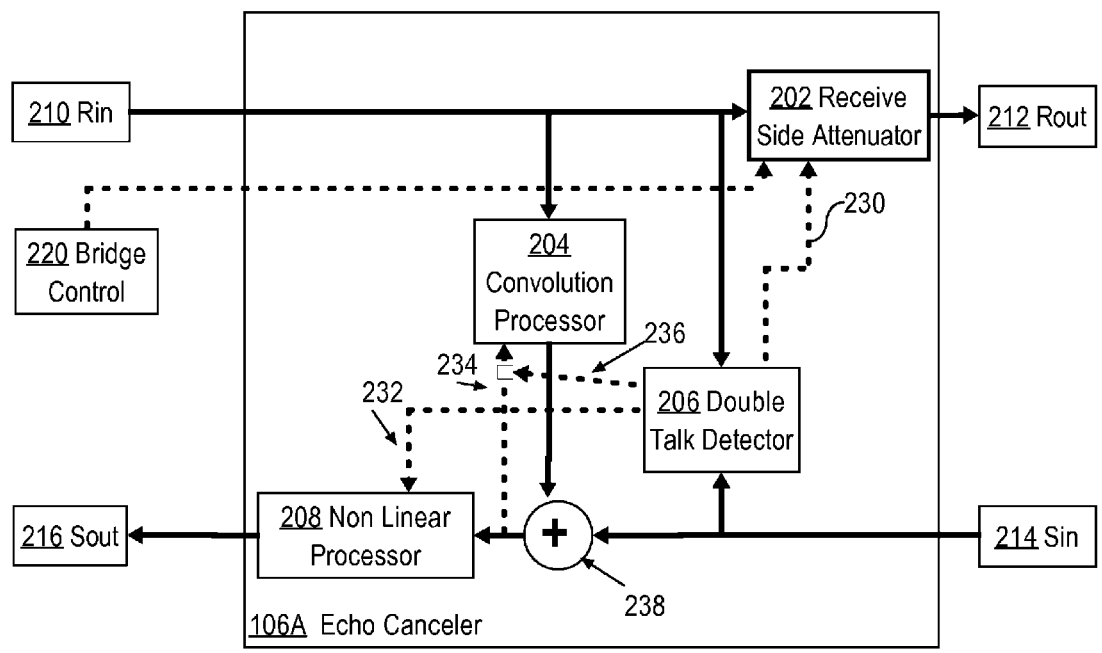
FIG. 3 illustrates a second embodiment of an echo canceller.
Figure 4:
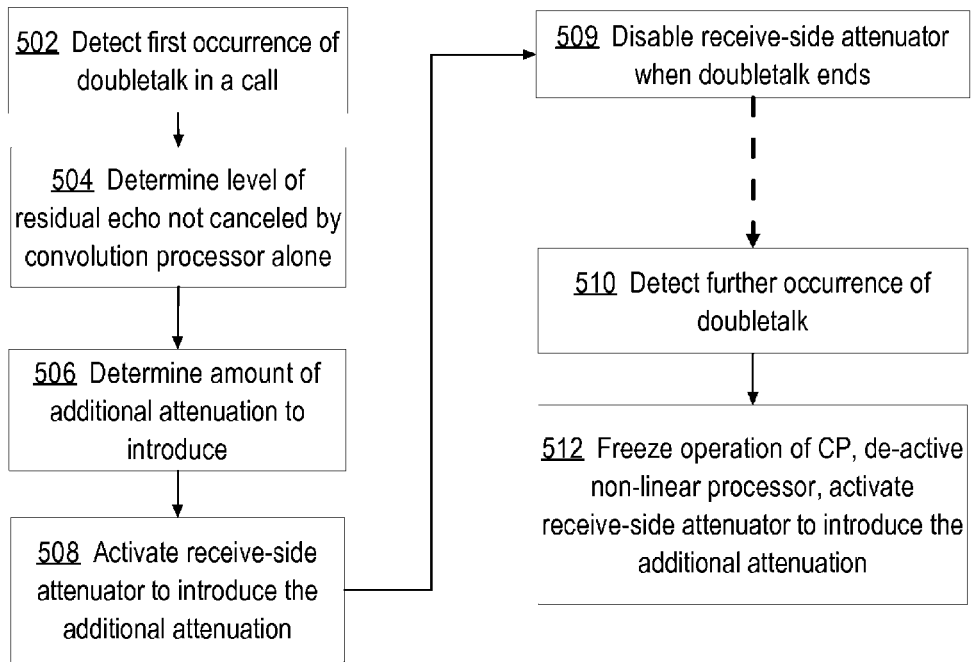
FIG. 4 illustrates a computer-implemented method of echo cancellation.

In an embodiment, each of the echo cancellers 106A, 106B, 106C, 106N comprises a unit operable during double-talk by some conference participants to provide effective echo control to the other participants who are not speaking. FIG. 2 illustrates a first embodiment of an echo canceller; FIG. 3 illustrates a second embodiment of an echo canceller. Referring first to FIG. 2, echo canceller 106A is coupled in the receive direction to caller 110A using Rin 210 and Rout 212. The purpose of ECAN 106A is to cancel any echo of the signal coming out of the ECAN at Rout 212 and echoing back from caller 110A and entering the ECAN at Sin 214. Any residual echo that has not been cancelled exits the ECAN at Sout 216 and continues toward the conference bridge 102 (FIG. 1).

The receive-side signal from Rin 210 is coupled to convolution processor (CP) 204, which uses the signal entering the ECAN at Rin and the signal entering at Sin 214 and creates an estimate of the echo impulse as a function of time. The echo impulse response may be termed the H-register image. The impulse response is used by the CP 204 to create an estimate of the echo signal used to eliminate the echo.

An output of CP 204 is coupled to a summation block 238 that subtracts the estimate from the signal at Sin 214. The signal at the output of the summation block 238 is coupled to non-linear processor 208 and is typically called the error signal. The term "error signal" is used because if caller 110A is not speaking and the echo path impulse response is linear and time invariant (and the echo is within the range the CP 204 can accommodate), then the output of the summation block 238 should be zero if the impulse response estimate was perfect. Any non-zero output of summation block 238 is representative of the error in approximating the echo path, and is coupled as a control signal 234 to the CP 204, to update the CP toward a better convergence estimate.

The ECAN 106A further comprises a double-talk detector (DTD) 206 coupled in the receive-side signal path at a pickoff point located between Rin 210 and Rout 212 and in the send-side signal path at a pickoff point between Sin 214 and the summation block 238. If the DTD 206 concludes that caller 110A is silent, the CP 204 seeks to improve its estimate of the echo and the NLP 208 is activated using control path 232 to attenuate any residual echo that might be returned back toward the conference bridge.

Assume for example purposes that the active speaker is caller 110B; then caller 110A starts to talk, caller 110B continues to talk and all other participants in the conference call are silent. The DTD 206 in the ECAN 106A controlling echo from caller 110A then determines that there is double-talk (as will the DTD 206 controlling echo from caller 110B; all the other DTDs associated in the n−2 other ECANs (e.g., echo cancellers 106C, 106N) continue act as if there is only one talker, even though it is the combined signal of caller 110A and caller 110B.

The DTD 206 in ECAN 106A operates as follows when in a double-talk condition. Within ECAN 106A, the DTD 206 typically disables adaptation using a signal on control path 236 and the CP 204 typically stops trying to adapt, and the NLP 208 is de-activated using a signal on control path 232. The same operations occur in ECAN 106B, but since only ECAN 106A and ECAN 106B identify double-talk, the other ECANs 106C, 106N do not change their operation. Since a considerable amount of the echo attenuation may be provided by only the NLP 208, especially if the echo delay exceeds the tail length of the CP 204 of ECAN 106A or ECAN 106B, once the DTDs in ECAN 106A and ECAN 106B determine that double-talk is present, in a conventional ECAN the long delay echo is passed through (and not reduced) to the conference bridge 102 by these two connections.

In contrast, in an embodiment, ECAN 106A as shown in FIG. 2 further comprises a receive-side signal attenuator (RSA) 202 coupled in the receive-side signal path between Rin 210 and Rout 212 prior to the pick-off point of the signal for the CP 204. The RSA 202 may be implemented either within the ECAN 106A in the conference bridge, or in other bridge elements on the mixer side of the ECAN 106A, and for this reason the RSA is shown in FIG. 2 as overlapping a boundary of ECAN 106A. In an embodiment, RSA 202 comprises a signal power attenuator in the direction from Rin 210 to Rout 212. When RSA 202 is activated, conference call participants actively engaging in double-talk receive reduced loudness in the receive signal during the double-talk. All the other participants continue to have normal sound volume level with good echo control.

The operation of RSA 202 in cooperation with other elements of the echo canceller of FIG. 2 is now described with further reference to FIG. 5, which illustrates a computer-implemented method of echo cancellation. In step 502, a first occurrence of double-talk in a call is detected. For example, double-talk detector 206 detects double-talk occurring using the means described above.

In step 504, a level of residual echo that was not canceled by the convolution processor alone is determined. In one embodiment, the RSA 202 is under the combined control of both the DTD 206 within the ECAN 106A and the speech processor in the conference bridge 102, as indicated by control paths 230, 220, respectively. Control path 220 from the conference bridge is optional and is not required in all embodiments. When control path 220 is present, the DTD 206 and the speech processor can communicate with one another to ascertain the degree to which the residual echo has been cancelled by the CP 204 alone. In an embodiment, during a training interval in which the speaker is silent and a training tone is being played by the conference bridge 102, the DTD 206 disables the NLP 208 using a signal directed from the DTD to the NLP on a control path 232, and stops or slows the adaptation of the CP 204 (as it would during double-talk); the speech processor then measures the residual echo arriving at Sout 216. The level of the residual echo is generally loudest when either the echo path is not linear and/or time invariant or when the echo path delay exceeds the tail length of the ECAN 106A.

Using this information, the amount of attenuation that should be introduced by the RSA 202 is calculated. As stated in step 506, the amount of additional attenuation to introduce is determined. In step 508, the receive-side attenuator is activated to introduce the additional attenuation. In step 509, the receive-side attenuator is disabled when double-talk ends.

During subsequent occurrences of double-talk, in addition to stopping or slowing the rate of adaptation of the CP 204 and de-activating the NLP 208, the RSA 202 is activated, as indicated in step 510 and step 512.

In another embodiment, when access to both the DTD 206 and the speech processor is not available, additional attenuation may be introduced during double-talk, as determined by either the DTD alone or the speech processor alone. Thus, step 504 may involve the DTD alone or the speech processor alone determining the amount of additional attenuation.

The amount of additional attenuation may vary in various embodiments. Typically nominal attenuation is sufficient and an example amount of attenuation may be 5 dB or 10 dB of loss, but the amount of attenuation may be lesser or greater than this range in various embodiments depending upon conditions or the particular application; thus, an embodiment is not limited to a particular range of attenuation. Further, since some conference bridge mixing algorithms only include a plurality of the loudest active talkers, whenever the speech processor is involved in the decision to activate the RSA 202, the decision whether to introduce supplemental attenuation can be based on whether the speaker engaged in double-talk is actually in the mix of speakers being played out from the bridge.

In one embodiment, an Echo Return Loss Enhancement (ERLE) value is computed in the CP 204 based on signal activity without the need for generating active signals, and the ERLE may be used for controlling the amount of attenuation that is introduced by RSA 202. Thus, step 506 may involve using the ERLE to determine the amount of additional attenuation.

In various embodiments, RSA 202 may be configured in various locations within the ECAN 106A. For example, in one alternate embodiment, RSA 202 is coupled in the signal path from Rin 210 to Rout 212 after a pick-off point of the signal for the CP 204 and before a pick-off point of the signal for the DTD 206. In FIG. 3, in another alternate embodiment, RSA 202 is coupled in the signal path from Rin 210 to Rout 212 after a pick-off point of the signal for the CP 204 and after a pick-off point of the signal for the DTD 206. In both such alternatives, the RSA is fully contained within the ECAN 106A.

Thus, in the approach herein, an echo canceller comprises a receive-side signal attenuator, which is added to the receive direction of a network echo canceller when a double-talk condition has been detected. When employed, the RSA controls previously uncontrollable echo during intervals of double-talk. During intervals without double-talk, the RSA is deactivated. Embodiments may be used by manufacturers of echo cancellers and more generally by manufacturers of voice telephony systems such as conference bridges. Embodiments are operable equally well with traditional, cellular or IP voice telephony.

Embodiments may be implemented in hardware such as a digital signal processor (DSP) or application-specific integrated circuit (ASIC), software, firmware, or a combination thereof. Embodiments may include or may be coupled to additional elements that are not depicted in FIG. 1-4 for clarity, such as memory and storage devices. A software embodiment may be implemented in a general-purpose data processing system that is adapted to operate as a conference call bridge and that includes a mixer, signal processor, and interface hardware for receiving and sending voice signals or voice encoded in data. In one embodiment, the techniques described herein are performed by a computer system in response to a processor executing one or more sequences of one or more instructions contained in a main memory. Such instructions may be read into the main memory from another machine-readable medium, such as a storage device. Execution of the sequences of instructions contained in the main memory causes the processor to perform the process steps described herein.

The term "machine-readable medium" as used herein refers to any medium that participates in providing data that causes a machine to operation in a specific fashion. In an embodiment implemented using a computer system as described herein, various machine-readable media are involved, for example, in providing instructions to the processor for execution. Such a medium may take many forms, including storage media. Storage media includes both non-volatile media and volatile media. Non-volatile media includes, for example, optical or magnetic disks. Volatile media includes dynamic memory, such as main memory. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to the processor for execution. For example, the instructions may initially be carried on a magnetic disk of a remote computer. The instructions received by the main memory may optionally be stored on the storage device either before or after execution by the processor.

3.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An echo canceller apparatus, comprising:
a receive side attenuator coupled in a receive side signal path that is configured to couple from a conference call bridge to a caller;
a convolution processor coupled to the receive side signal path at a pick-off point;
a double-talk detector coupled to the receive side signal path and to a sending side signal path that is configured to couple from the caller to the conference call bridge;
logic coupled to the receive side attenuator which is configured to:
responsive to a double-talk condition detected by the double-talk detector,
determine a level of echo canceled by the convolution processor,
determine an additional amount of attenuation to introduce to a caller input signal, and
activate the receive side attenuator to introduce the additional attenuation to the caller input signal;
wherein the caller input signal is provided to a caller causing the double-talk condition.

2. The apparatus of claim 1, further comprising logic which when executed by the processor is operable to disable the receive side attenuator when the double-talk condition ends, to detect a further occurrence of double-talk, and in response thereto, to stops or slows the adaptation of the convolution processor, deactivate a non-linear processor that is coupled in the sending side signal path, and to again activate the receive side attenuator to introduce the additional attenuation.

3. The apparatus of claim 1, wherein the receive side attenuator is coupled in the receive side signal path before the convolution processor pick-off point.

4. The apparatus of claim 1, wherein the receive side attenuator is coupled in the receive side signal path after the convolution processor pick-off point.

5. The apparatus of claim 1, wherein the receive side attenuator is in the conference call bridge.

6. The apparatus of claim 1, further comprising a first control signal path coupled from the conference call bridge to the receive side attenuator, and logic which when executed is operable to cause the conference call bridge to determine the additional amount of attenuation to introduce and to provide the additional amount of attenuation to introduce to the receive side attenuator on the first control signal path.

7. The apparatus of claim 6, further comprising a second control signal path coupled from the double-talk detector to the receive side attenuator, and logic which when executed is operable to cause the conference call bridge to communicate with the double-talk detector using one or more of the control signal paths to determine the level of echo canceled by the convolution processor.

8. The apparatus of claim 1, further comprising logic which when executed causes obtaining an echo return loss enhancement (ERLE) value from the convolution processor and using the ERLE to determine the additional amount of attenuation.

9. The apparatus of claim 1, further comprising logic which when executed causes activating the receive side attenuator only when a speaker engaged in double-talk is actually in a mix of speakers that are being played out from the conference call bridge.

10. A conference call bridge apparatus, comprising:
a mixer;
a plurality of echo cancellers coupled to the mixer, wherein each of the echo cancellers comprises:
a receive side attenuator coupled in a receive side signal path that is configured to couple from the mixer to a caller;
a convolution processor coupled to the receive side signal path at a pick-off point;
a double-talk detector coupled to the receive side signal path and to a sending side signal path that is configured to couple from the caller to the mixer;
logic coupled to the receive side attenuator which is configured to:
responsive to a double-talk condition detected by the double-talk detector:
determine a level of echo canceled by the convolution processor,
determine an additional amount of attenuation to introduce to a caller input signal, and
activate the receive side attenuator to introduce the additional attenuation to the caller input signal;
wherein the caller input signal is provided to a caller causing the double-talk condition.

11. The apparatus of claim 10, further comprising logic which when executed by the processor is operable to disable the receive side attenuator when the double-talk condition ends, to detect a further occurrence of double-talk, and in response thereto, to stops or slows the adaptation of the convolution processor, deactivate a non-linear processor that is coupled in the sending side signal path, and to again activate the receive side attenuator to introduce the additional attenuation.

12. The apparatus of claim 10, wherein the receive side attenuator is coupled in the receive side signal path before the convolution processor pick-off point.

13. The apparatus of claim 10, wherein the receive side attenuator is coupled in the receive side signal path after the convolution processor pick-off point.

14. The apparatus of claim 10, further comprising a first control signal path coupled from a signal processor in the conference call bridge to the receive side attenuator, and logic which when executed is operable to cause the signal processor to determine the additional amount of attenuation to introduce and to provide the additional amount of attenuation to introduce to the receive side attenuator on the first control signal path.

15. The apparatus of claim 14, further comprising a second control signal path coupled from the double-talk detector to the receive side attenuator, and logic which when executed is operable to cause the signal processor to communicate with the double-talk detector using one or more of the control signal paths to determine the level of echo canceled by the convolution processor.

16. The apparatus of claim 10, further comprising logic which when executed causes obtaining an echo return loss enhancement (ERLE) value from the convolution processor and using the ERLE to determine the additional amount of attenuation.

17. The apparatus of claim 10, further comprising logic which when executed causes activating the receive side attenuator only when a speaker engaged in double-talk is actually in a mix of speakers that are being played out from the mixer.

18. A computer-implemented method, comprising:
in response to detecting an occurrence of double-talk in a call:
- determining a level of residual echo that has been canceled by a convolution processor;
- determining an amount of additional attenuation for a caller input signal to introduce in an echo canceller that is processing the call; and
- activating a receive-side attenuator in the echo canceller to introduce the additional attenuation to the caller input signal;

wherein the caller input signal is provided to a caller causing the double-talk condition;

disabling the receive-side attenuator when the double-talk ends.

19. The method of claim 18, further comprising detecting a further occurrence of double-talk, and in response thereto, stopping or slowing the rate of adaptation of the convolution processor, deactivating a non-linear processor that is coupled in the sending side signal path, and again activating the receive side attenuator to introduce the additional attenuation.

20. The method of claim 18, further comprising activating the receive side attenuator in a receive side signal path, which is configured to couple from a conference call bridge to a caller, before a pick-off point in the receive side signal path at which a convolution processor is coupled.

21. The method of claim 18, further comprising activating the receive side attenuator in a receive side signal path, which is configured to couple from a conference call bridge to a caller, after a pick-off point in the receive side signal path at which a convolution processor is coupled.

22. The method of claim 18, further comprising activating the receive side attenuator in a conference call bridge.

23. The method of claim 18, further comprising determining in a conference call bridge the additional amount of attenuation to introduce and providing the additional amount of attenuation to introduce to the receive side attenuator on a first control signal path that is coupled from the conference call bridge to the receive side attenuator.

24. The method of claim 23, further comprising causing the conference call bridge to communicate with the double-talk detector to determine the level of echo canceled by the convolution processor, using one or more of the first control signal path and a second control signal path coupled from the double-talk detector to the receive side attenuator.

25. The method of claim 18, further comprising obtaining an echo return loss enhancement (ERLE) value from the convolution processor and using the ERLE to determine the additional amount of attenuation.

26. The method of claim 18, further comprising activating the receive side attenuator only when a speaker engaged in double-talk is actually in a mix of speakers that are being played out from the conference call bridge.

* * * * *